United States Patent [19]
Andersen et al.

[11] Patent Number: 5,583,505
[45] Date of Patent: Dec. 10, 1996

[54] RADAR PULSE DETECTION AND CLASSIFICATION SYSTEM

[75] Inventors: David P. Andersen, Burnsville; Steven A. Murphy, Apple Valley, both of Minn.

[73] Assignee: Lockheed Martin Corporation, Bethesda, Md.

[21] Appl. No.: 526,352

[22] Filed: Sep. 11, 1995

[51] Int. Cl.$^6$ .................................................. G01S 7/40
[52] U.S. Cl. ............................. 342/13; 342/40; 342/189
[58] Field of Search ................................. 342/13, 40, 189

[56] References Cited

U.S. PATENT DOCUMENTS

| | | | |
|---|---|---|---|
| 3,518,555 | 6/1970 | Van Horn et al. | 343/17.2 R |
| 3,546,599 | 12/1970 | Konotchick et al. | 328/105 |
| 3,718,929 | 2/1973 | Van Horn | 343/17.2 R |
| 3,743,948 | 7/1973 | Dahlin et al. | 328/119 |
| 3,851,261 | 11/1974 | Geiger | 328/165 |
| 3,922,676 | 11/1975 | O'Berry et al. | 343/17.1 PF |
| 3,940,768 | 2/1976 | Olsen et al. | 343/18 E |
| 3,999,136 | 12/1976 | O'Berry et al. | 328/138 |
| 4,109,197 | 8/1978 | Lang, Jr. et al. | 324/78 F |
| 4,146,892 | 3/1979 | Overman et al. | 343/18 E |
| 4,209,835 | 6/1980 | Guadagnolo | 364/715 |
| 4,217,580 | 8/1980 | Lowenschuss | 343/5 DP |
| 4,393,382 | 7/1983 | Jones | 343/112 D |
| 4,516,220 | 5/1985 | Baumann | 364/715.11 |
| 4,721,958 | 1/1988 | Jenkin | 342/13 |
| 4,728,958 | 3/1988 | Choate | 342/424 |
| 4,918,455 | 4/1990 | Maier | 342/13 |
| 5,063,385 | 11/1991 | Caschera | 342/13 |
| 5,247,311 | 9/1993 | Sobocinski | 342/453 |

*Primary Examiner*—John B. Sotomayor
*Attorney, Agent, or Firm*—Glenn W. Bowen

[57] ABSTRACT

A radar pulse detection and classification system receives times-of-arrival of pulses from simultaneous emitters over a wide range of pulse repetition frequencies (PRF's). The pulses are deinterleaved into bands of pulse repetition intervals (PRI's) so that a fixed number of pulses are required for detection of an emitter regardless of the PRI of the emitter. The pulse periodicities of the pulses in a pulse stream are determined by autocorrelation, and candidate emitter PRI's are selected from the pulse periodicities which were determined by autocorrelation. The pulses of candidate emitters are time-integrated to obtain time-integrated signals, and emitters are detected from peaks in the time-integrated signals. The time-continuity of said pulses are measured to determine emitter existence. The system receives pulses from both jittered and non-jittered emitters. It estimates jitter width in a pulse stream by utilizing peak pulse widths found by autocorrelation and removes jittered emitters from a pulse stream by predicting their times of arrival from the known PRI phase and jitter estimated for a previous pulse stream.

8 Claims, 14 Drawing Sheets

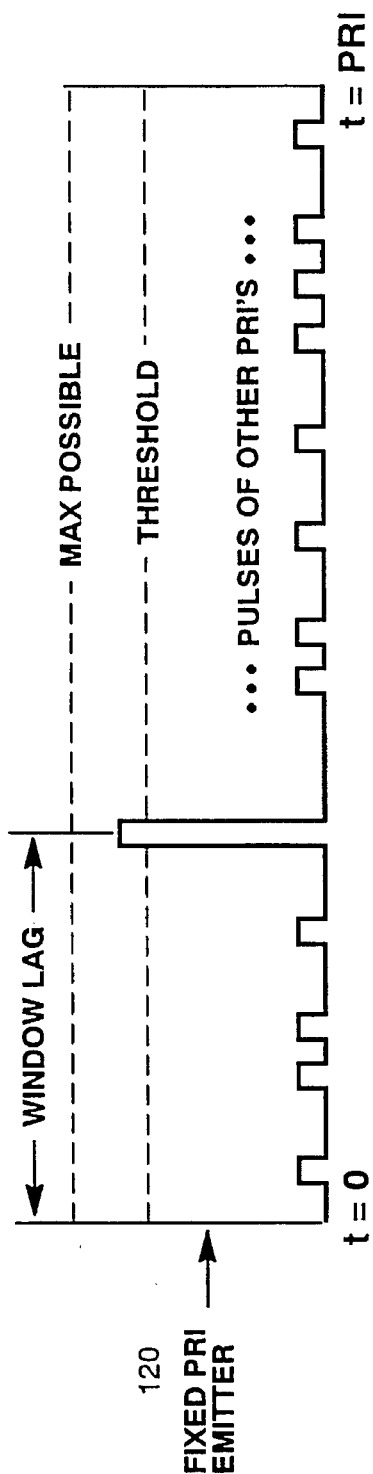
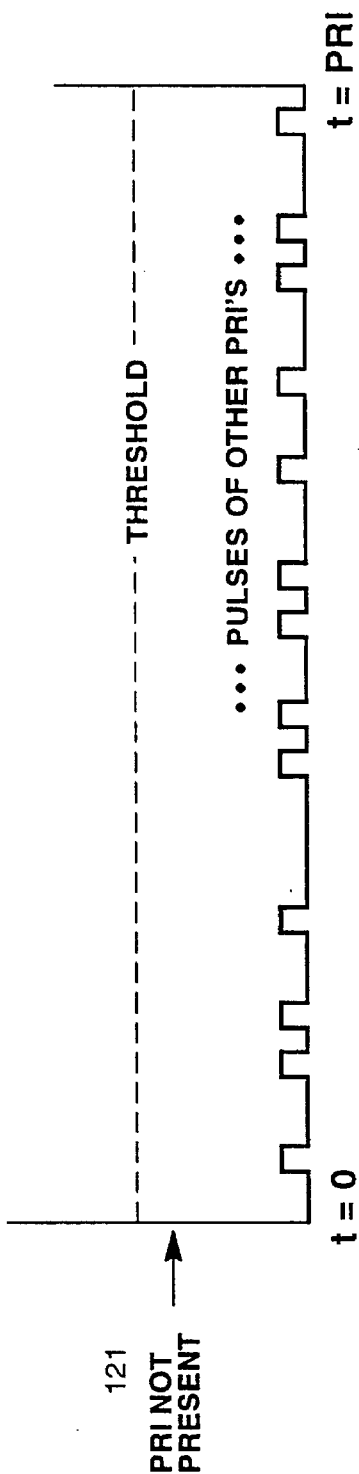
Figure 10a
Figure 10b

RADAR PULSE DETECTION AND CLASSIFICATION SYSTEM

BACKGROUND OF THE INVENTION

Field of the Invention.

This invention relates to the detection of the bearing and frequency of multiple sources of radar sources and radar return from targets, and more particularly to the detection and classification of such pulses through the utilization of a new and improved pulse de-interleaving technique. Prior multiple radar tracking pulse techniques involved pulse-by-pulse de-interleaving and histogram-based algorithms. Pulse-by-pulse de-interleaving systems process pulses individually which limits the ability of these system to adequately detect emitters with a large number of stagger positions or highly jittered emitters. Prior histogram-based methods were limited in their ability to detect staggered emitters and to determine time-of-arrival differences between each of the pulses in the staggered pulse sequence. The present invention overcomes these limitations.

SUMMARY OF THE INVENTION

Pulses from a plurality of emitters are detected and classified by deinterleaving the received pulses into bands of pulse repetition intervals (PRI's) so that a fixed number of pulses are required for detection of an emitter regardless of the PRI of the emitter. Pulse periodicities of said received pulses are determined by autocorrelation and candidate emitter PRI's are selected from the pulse periodicities. The pulses of candidate emitter PRI's are time-integrated, and possible emitters are detected from peaks in the time-integrated signals. Emitter existence is confirmed by measuring time-continuity of the pulses. Jittered and non-jittered emitter pulses are processed by detecting the peak pulse widths of the peaks and estimating the jitter width of a pulse stream by utilizing the peak pulse widths. Jittered emitters are removed from a pulse stream by predicting the times-of-arrival of a pulse stream based upon estimated jitter of previous pulse streams. Staggered and non-staggered emitter pulses are processed by identifying the pulse-repetition intervals and phase relationship characteristics of staggered emitters by computing the time received pulses are offset from each emitter with respect to a time window. Clustered and non-clustered emitter pulses are processed by identifying clustered emitters and by eliminating the times of arrival of received pulses of emitters having periodic pulse characteristics and by measuring the time differences of the remaining pulses.

BRIEF DESCRIPTION OF THE DRAWINGS

The invention is illustrated by reference to the drawings in which:

FIG. 2b is an expanded block diagram of the intra-pulse analysis block of FIG. 2a;

FIG. 6b is a diagram of autocorrelation values as a function of the lag, or offset, of the pulses of FIG. 6a;

FIGS. 10a–10e is a diagram that shows how pulse streams in an integrator form an image of an emitter's pulse repetition period on various types of emitters;

TECHNICAL DESCRIPTION OF THE INVENTION

Figure 1:
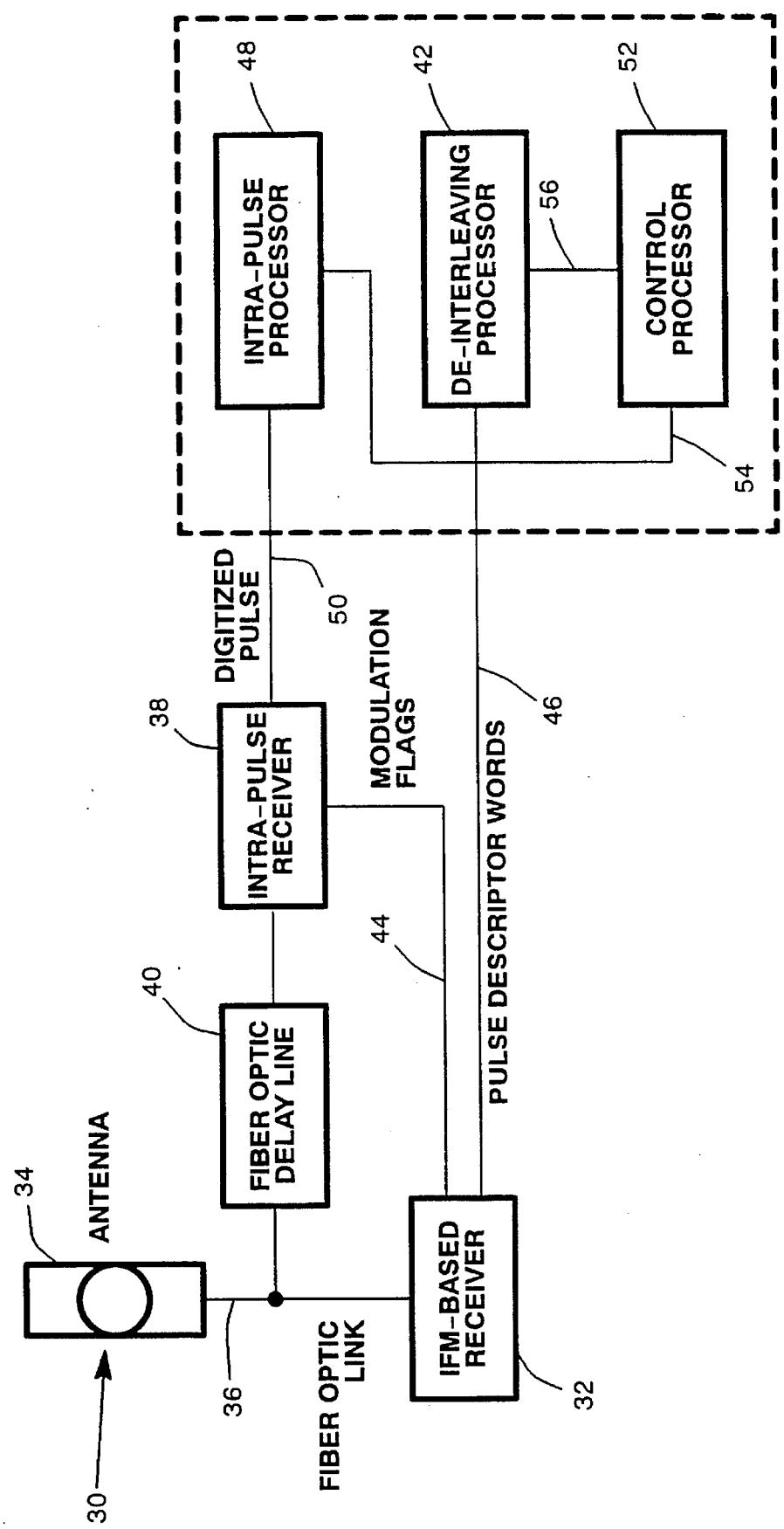
FIG. 1 is a block diagram of a radar system which includes a de-interleaving processor section.

General System Description. In the de-interleaving system of the invention radar pulses are received and are sorted into groups by bearing and frequency windows. This de-interleaving system preferably employs pipelined processing elements for calculating pulse-repetition-intervals and other properties of intercepted radar signals. The process is performed in real time by use of an algorithm that is inherently pipelined and scaleable in order to achieve high accuracy and throughput. Parallel processing architecture is preferably employed to provide an extremely high probability of detection of signals within a broad range of frequencies and pulse repetition intervals while operating in extreme pulse densities. Each group of received radar signals will have pulses that are in the same bearing and frequency window and all active signal groups are tracked.

If more signal groups appear in the data stream than there are columns 114 in a viewing window, then scheduling logic will assign more than one bearing/frequency 51 window to the same column. Once the pulses are sorted by bearing and frequency, an autocorrelation process starts 60. Autocorrelation is done in pulse repetition frequency (PRF) bands starting with the maximum PRF. Data representative of the pulses are stored in a pulse memory 90, such data indicating the difference in the time of arrival (TOA) 94 of each set of two pulses or pulse repetition interval (PRI) provides the memory addresses (96) for autocorrelation memory bins (98). A storage number representative of the number of sets of pulses in the bin is incremented. A peak detector 102 examines the result of each increment and keeps track, on the fly, or increase time, of bins that have a storage number that goes above a threshold number.

Candidate emitter PRI's 104 are passed to integrator scheduling logic 115 which schedules an integrator from a common pool of integrators 116. Scheduling from a common pool of integrators saves a significant amount of logic versus building enough integrators for each stage of autocorrelation. The pulses 106 come in and a bin address 109 is calculated based on the candidate 104, and the PRI to that bin is then incremented 110. Once again on the fly peak detection 112 is done to find the valid emitters. The valid PRI's 113 are sent back to the autocorrelation logic where they are used to extract the pulses 118 of the detected emitters from the pulse stream. The remaining pulses are then passed on to the next band for further processing, and the valid PRI's are also sent to a display device 117.

Advantages that can be expected from use of the de-interleave algorithm are as follows:

For stable emitters:

Simultaneous stable PRI's differing by up to 3 orders of magnitude

Multiple emitters of identical PRI but different phases

Simultaneous simple emitters at same bearing and frequency

For jittered PRI emitters:

Two simultaneous randomly jittered emitters of non-overlapping jitter

Two simultaneous randomly jittered emitters of overlapping jitter

Two simultaneous randomly jittered emitters of identical PRI and jitter, but different phase Jittered emitters of 20%, or possibly more, jitter Jittered emitter of regularly repeating jitter FIG. 1 shows a hardware system 30 that may be employed to implement the invention. The receiver 32 receives information from an antenna over a fiber optic link 36. Frequency, pulse width, pulse amplitude, time of arrival, and frequency or phase modulation information is derived from the incoming signals. An intra-pulse receiver 38 is supplied input signals from a fiber optic delay line 40 that is coupled to the link 36. The receiver 38 is used for higher resolution analysis of the incoming modulated pulses under the control of modulation flag signals from the receiver 32.

The de-interleaving processor block 42, receives pulse description word signals on the lines 46 from the receiver 32, which is designed to automatically detect and identify both stable and exotic (complex output) emitters in very dense radar signal environments. The processor 42 preferably consists of a plurality of pipelined parallel processors. The method of the invention is suitable for detecting jittered and staggered emitters.

The intra-pulse processor 48, which receives digitized pulse signals on the lines 50 from the receiver 38 that have been flagged as modulated by the receiver 32, is designed to detect and recognize emitters that would not be recognizable from the pulse-by-pulse de-interleaving performed by the receiver 32, such as phase or frequency modulated signals. The processor 48 then performs a detailed analysis of the modulation of the signal. The modulation characteristics of the pulse are then used to recognize the emitter and extract subsequent pulses associated with that emitter from the incoming pulse train.

Figure 2A:
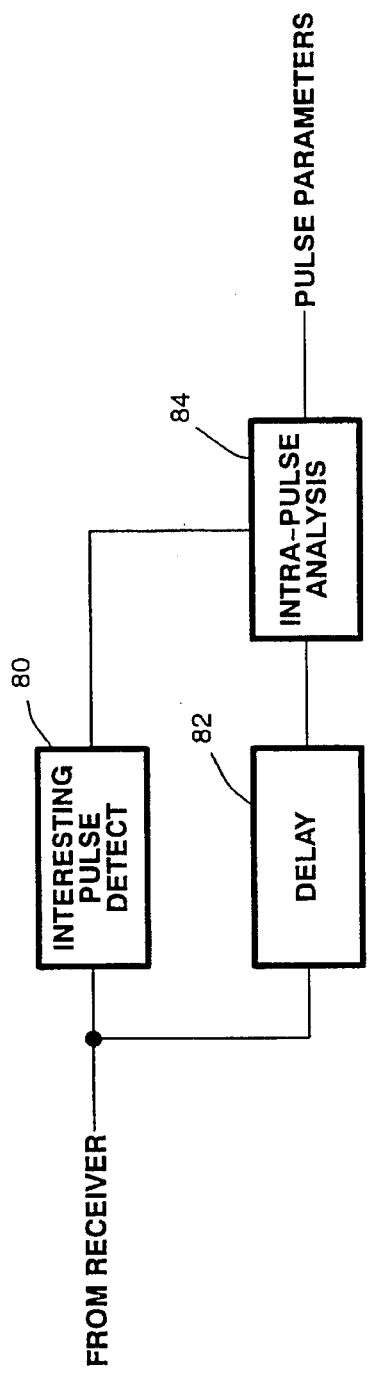
FIG. 2a is a block diagram of the intra-pulse processor of FIG. 1.
Figure 2B:
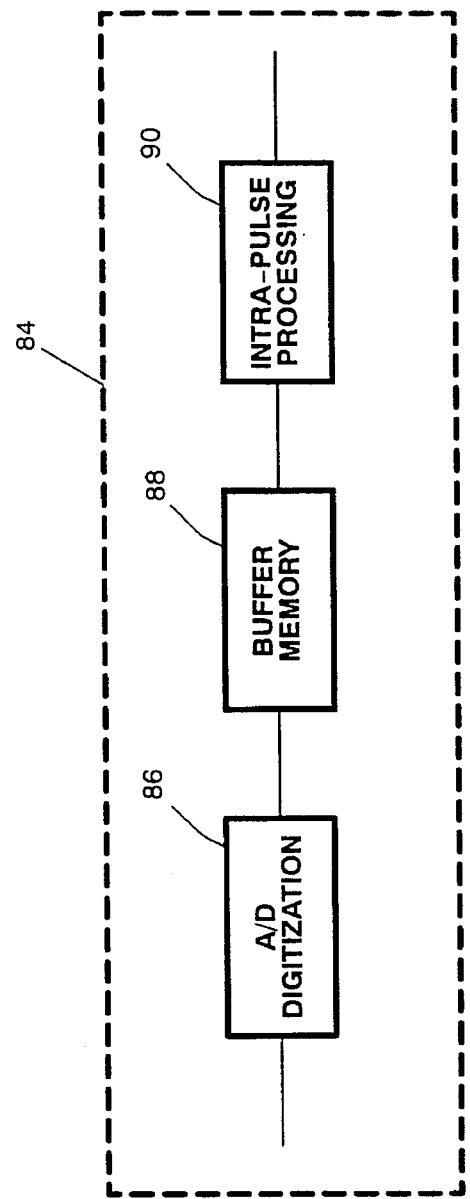

A block diagram for the intra-pulse processor (IPP) 48 is shown in FIGS. 2a and 2b. The electromagnetic information from the receiver 38 is analyzed by the intra-pulse processor 48 function to determine if the pulse is frequency or phase modulated. If a frequency or phase modulation is detected (step 80) (i.e., it is an "interesting pulse"), it is analyzed by the intra-pulse analysis processor. So that each pulse does not have to be analyzed, all pulses are delayed in the delay line 82 until the determination is made to analyze the pulse by the intra-pulse analysis section 84 of the processor 48. The pulse is digitized by an A/D converter 86 preferably operating in the 400–500 MHz range. The digitized pulse data is buffered in a buffer memory 88 which is then analyzed by the programmable intra-pulse analyzer 90 of which there are known analyzers that may be utilized.

The fiber optic link 36 (FIG. 1) is a broadband analog link that transfers the incoming analog RF signals from an antenna to the receiver subsystems. The signals from all frequency bands and all antennas are transmitted over this single fiber optic link. The integrated fiber optic delay line 40 allows the incoming pulse train to be fed to the intra-pulse receiver 38 upon detection of a modulated pulse by the de-interleaving receiver 32. The delay line time is determined by the reaction time of the receiver 32. The control processor 52 is coupled to the processor 42, 48 over the lines 54, 56 and coordinates the operation.

The pulse processing system determines pulse repetition intervals and the features of intercepted radar signals utilizing their frequency, bearing, and times of arrival. The system is capable of separating mixed stable, jittered and staggered emitters, even multiple emitters of the same or harmonically related PRF's, and it is tolerant of false pulses, missing pulses, and errors in time of arrival. It does this by considering all emitters to be jittered and measures their amount of jitter. It is specifically designed to handle very highly staggered emitters, and its accuracy actually improves as the number of stagger positions increases. The amount of processing required varies in direct proportion to the pulse rate and the type of emitters present. The system is useful for detection of multiple stable emitters, jittered emitters, highly staggered emitters and various combinations of all of these.

Figure 3:
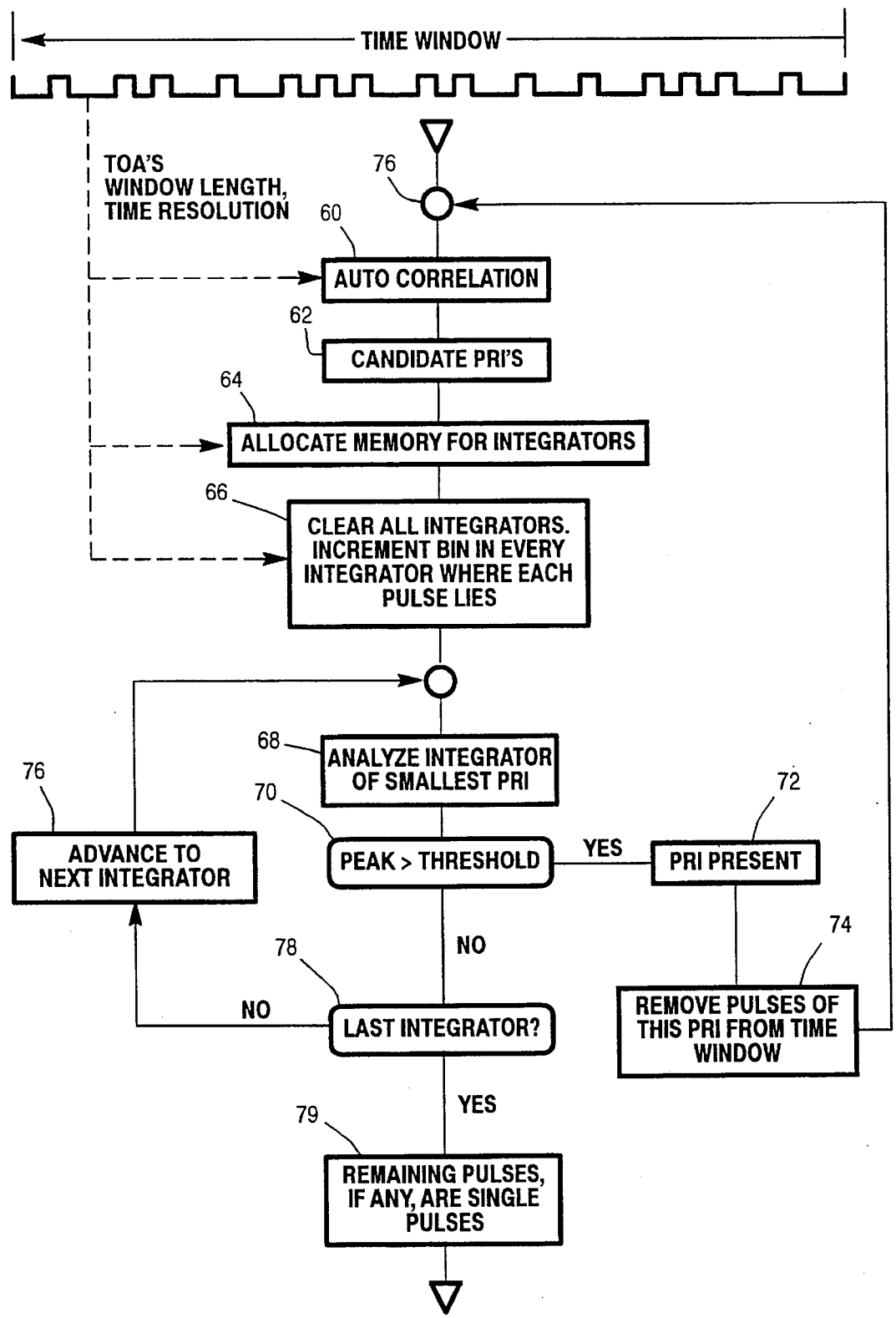
FIG. 3 is a flowchart of the autocorrelation and integration technique.

The software algorithm used to operate the system has two major components, (a) autocorrelation to determine the periodic components in the pulse train followed by (b) time integration to extract PRI's and other information. FIG. 3 provides a general overview of the processing algorithm. When an emitter is detected, its pulses are removed from the input and the process is repeated until no more emitters can be found.

Figure 4:
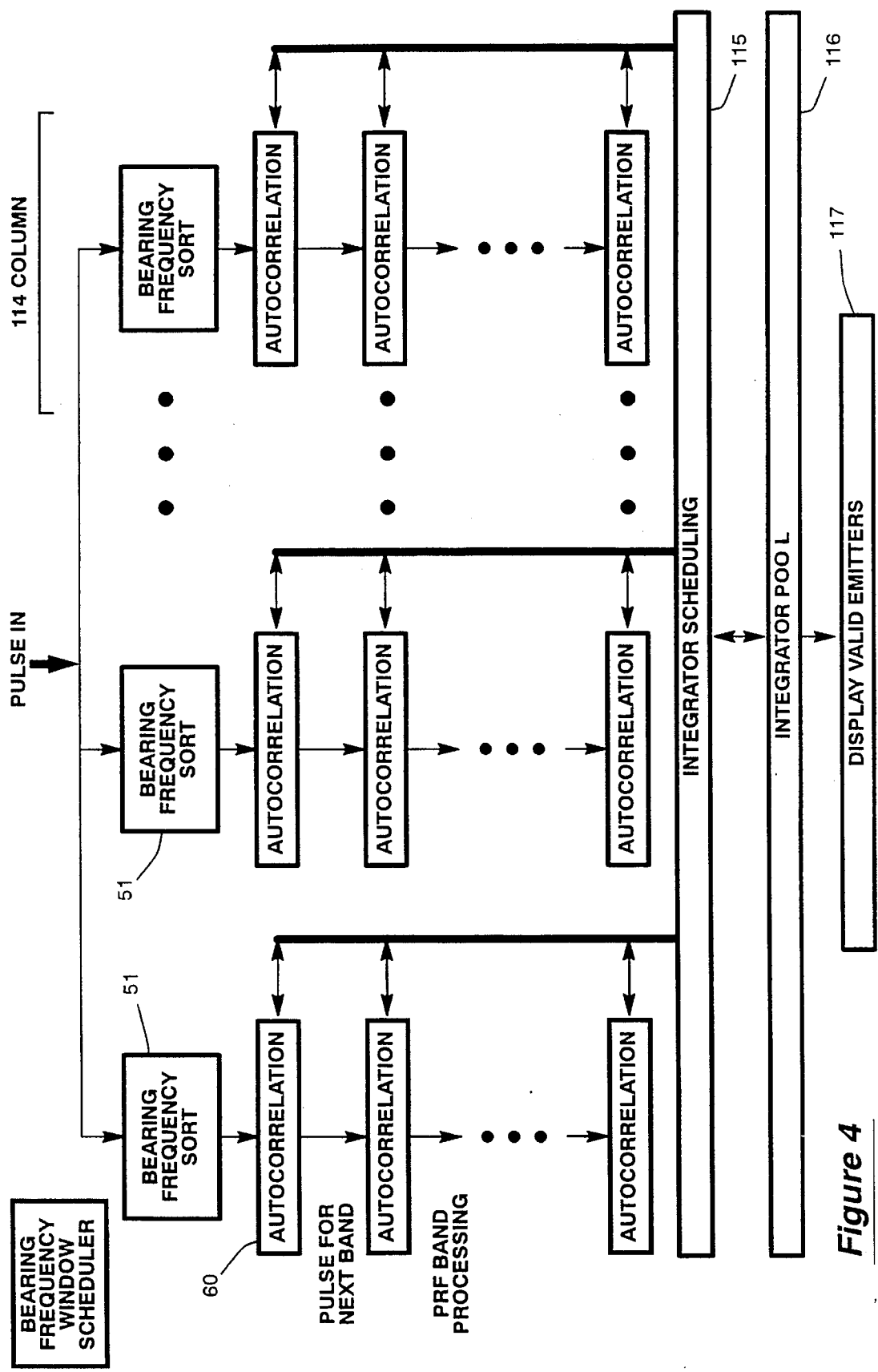
FIG. 4 is a data-flow diagram showing how autocorrelation may be performed with one or more pipeline processors operating in parallel.

The overall pulse deinterleaving system architecture is shown in FIG. 4 where the parallel columns each represent processing via a pipelined processor coupled in parallel to process the pulse data. When pulses are initially sorted by bearing and frequency 51 (FIG. 4), the initial frequency gates are set very wide to accommodate possible frequency agile emitters, including multiple emitters. Once the pulses are sorted by bearing and frequency (step 51), the autocorrelation process starts (step 60). Autocorrelation is done in PRF bands starting with a selected maximum PRF (MAX PRF) and continuing to a minimum PRF (MIN PRF). The PRF bands correspond to the time windowing defined in the introduction to the algorithms. One benefit of these bands is that they greatly reduce the number of harmonic relations that must be processed by the subsequent integration processing.

The algorithm has a number of unique features. For example, the algorithm does not distinguish jittered emitters from other emitters. All emitters are considered to be jittered, differing only in the amount of jitter. All emitters are considered to be potentially staggered as well. The algorithm identifies staggered emitters as phase relationships within a PRI, expressed as each pulse's position in the PRI as a percentage of PRI.

In addition, the process is lossless since no incoming pulse time-of-arrival information is lost, nor is any low-PRF emitter information lost. This allows low pulse-rate emitters to be extracted from environments of high pulse density. The algorithm is also able to detect emitters over a very large range of PRI's. Pulses which are not associated with an emitter are processed in progressively larger windows.

Figure 5:
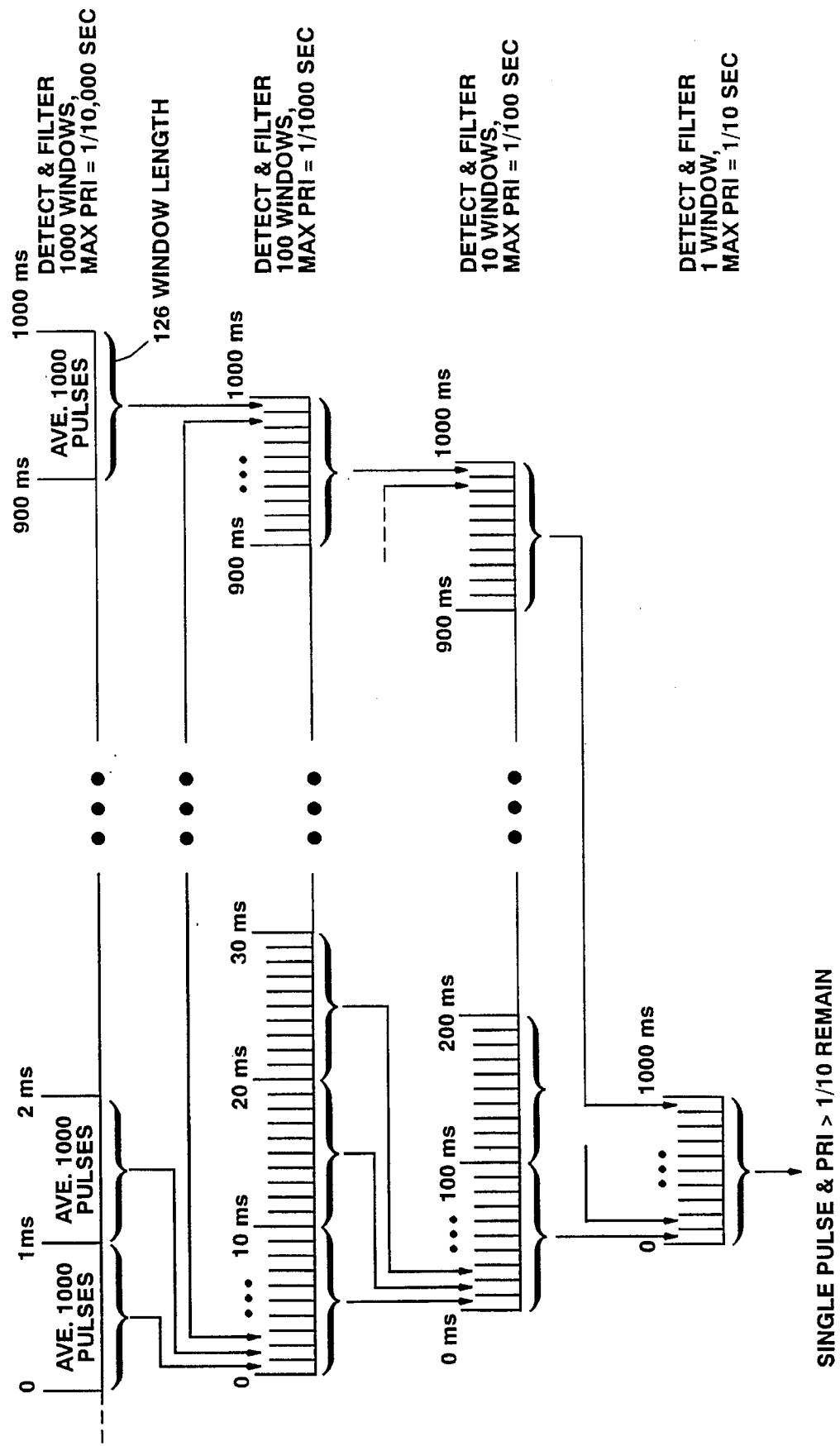
FIG. 5 is a diagrammatic illustration of windowing in time and the pulse repetition interval bands of the processing steps.

These larger time windows are used to detect progressively larger PRI's. FIG. 5 illustrates how this feature of the de-interleaving processor works. There are no dynamically changing thresholds in this algorithm which greatly enhances its robustness since there is only one fixed threshold. This threshold is used for both candidate selection in autocorrelation and envelope evaluation in integration.

Figure 6A:
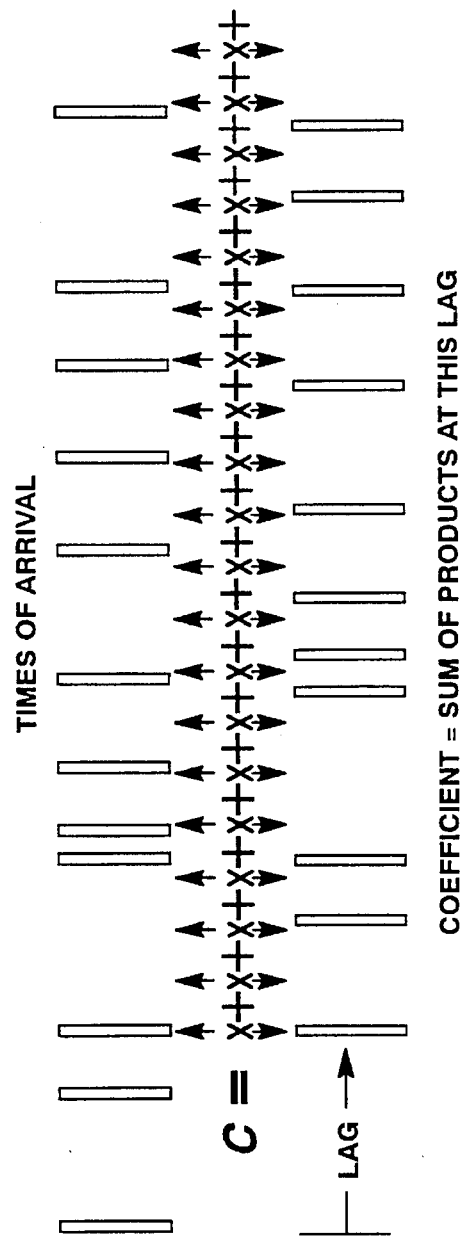
FIG. 6a is a diagram of pulses that is used to describe autocorrelation computation.
Figure 6B:
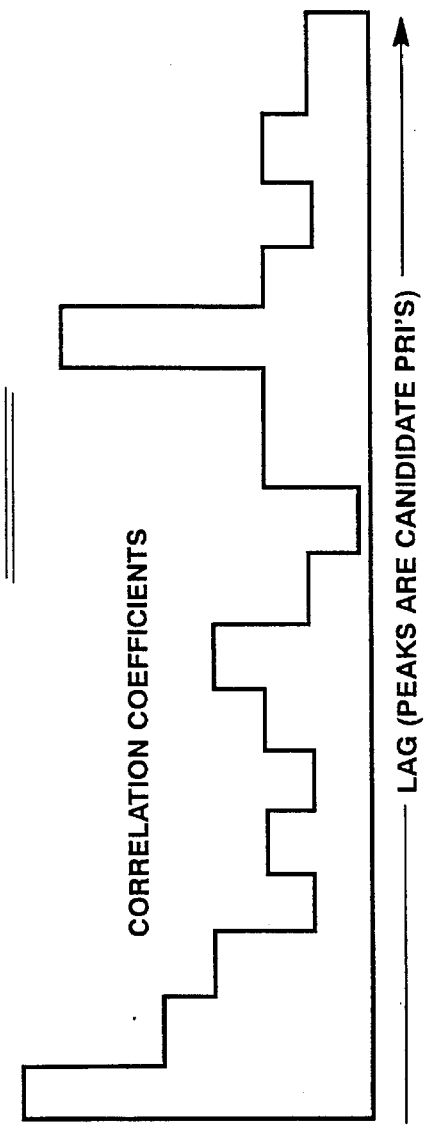

In the autocorrelation processing step 60 (FIG. 3), an autocorrelation coefficient, C, is produced which is a sum of the products of a time series with itself for all time lags. The series is shifted by one term and another sum of the products is computed to produce the next coefficient where the amount of shift is called the lag. Peaks in autocorrelation coefficients identify candidate PRI's (step 62) and a repeating pattern time series pattern is established. The lag at which this peak appears is the period of the pattern, as illustrated in FIGS. 6a and 6b.

The autocorrelation process compares a signal to itself at increasing time offsets, as shown in FIG. 6 revealing the existence of repeating patterns. This produces the inverse Fourier transform of the power spectrum of the signal, and thus contains the same periodicity information but not the phase information. Autocorrelation is preferred to fast Fourier transformation (FFT) analysis for this application because autocorrelation can be simplified for time-of-arrival analysis in a way that requires much less computation.

A jittered emitter forms a broadband peak whose width is a robust measure of the percentage of jitter. A staggered emitter forms a narrow peak whose height is a measure of the number of stagger positions. The more pulse positions a staggered emitter has, the better defined this peak becomes. For any emitter, a peak forms at a lag equal to its mean PRI. Peaks also form at other peridiocities associated with the harmonics of the PRI and the relative offsets of staggered emitters. The subsequent integration processing effectively removes these false candidates. Autocorrelation cannot by itself recover the waveshape of a signal, but it can detect the presence of an emitter and provide a candidate PRI for waveform recovery by signal averaging in the time domain. FIG. 6b shows the magnitude of correlation coefficients versus time lag for the example of the pulses shown in FIG. 6a.

Autocorrelation is a well known method of finding the period of repeating patterns. But not all repeating patterns within the input window represent emitter PRI's. Stagger intervals in all combinations are also repeating patterns causing peaks in the autocorrelation function. Temporary interference patterns between emitters cause peaks. Harmonics within an emitter's pulse pattern cause peaks in the autocorrelation function.

Peaks in the autocorrelation function represent repeating patterns in the input window. The lag at which a peak appears is the period of the pattern. The peak may be broadened due to more than one repeating pattern being present at slightly different periods. A jittered emitter produces a broadened peak due to its varying PRI. Inaccuracy in measuring time-of-arrival also broadens the peak. A randomly jittered emitter will not produce a well defined autocorrelation peak unless a large number of its pulses are included in the window. Fewer pulses will produce a jagged or skewed peak. Peak detection, therefore, requires more than merely finding a local maximum so that all PRI's (lags) within an autocorrelation peak must be considered to be candidates.

Figure 7:
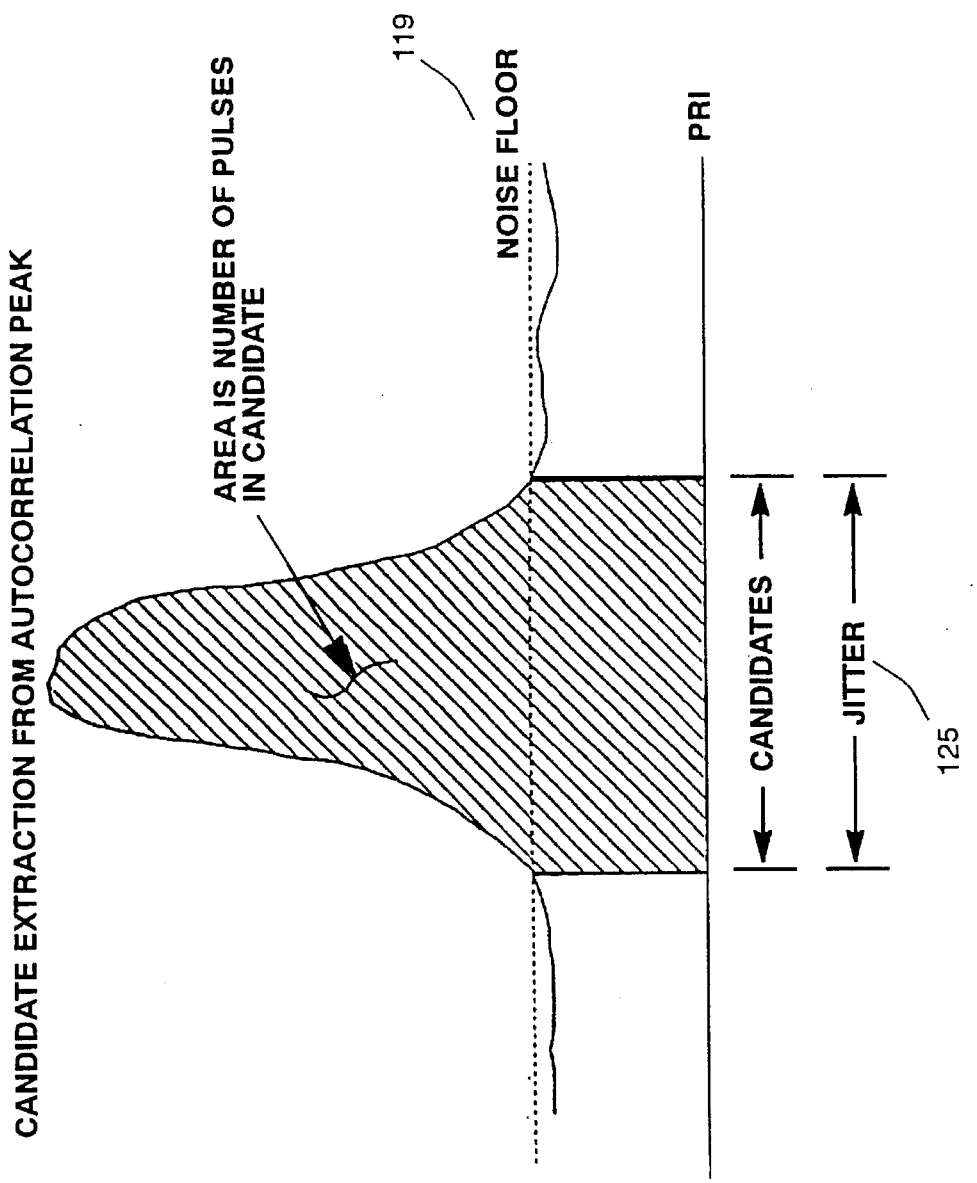
FIG. 7 is a diagram that shows selection of a candidate emitter from the area of a peak in the autocorrelation function.

As illustrated in FIG. 7, an estimate of the noise floor 119 of a candidate peak extracted by autocorrelation is made by finding the mean of all values in the autocorrelation array.

Then peaks are picked in the autocorrelation function starting with the smallest lag. Autocorrelation coefficients are searched for the first to rise above the noise floor 119. From there, the coefficients are searched for the next to fall below the noise floor. Along the way, the coefficients are summed and the location of the largest coefficient is recorded. The sum is compared to a minimum required to constitute a plausible correlation:

$$needed = threshold * window/center\_bin$$

where "needed" is the minimum sum of coefficients within a peak needed to declare correlation, "threshold" is a detection threshold from 50% to 100%, and the "center bin" is the location of the largest value in the peak and * indicates multiplication. "Needed" is the maximum number pulses that an emitter could have in a time interval of "window" derated by "threshold" to allow for missing pulses. If the sum exceeds "needed", then a candidate of PRI=center_bin is declared. If not, the next peak is found until all coefficients are exhausted. "Threshold" should not be less than 50% because this would cause sub-multiples of an emitter's PRI to be declared. Typically, the "threshold" is set at 60% but other values are possible.

When a candidate is declared, all lags within the peak are declared to be candidate PRI's. This is necessary because jitter in an emitter will cause an autocorrelation peak to be broadened. Even a stable emitter may have a PRI which falls between two autocorrelation lags broadening the peak. Also, two or more emitters that have very close PRI's may be too close to be resolvable. If any of the candidates prove to be an emitter, the width of the autocorrelation peak becomes its jitter width. This parameter is also used when deciding which pulses to delete when removing an emitter from the input data block.

Autocorrelation peak detection is suspended when a cluster of candidates is declared. Control is transferred to integration and detection. If none of the candidates prove to be genuine, peak detection in the autocorrelation function resumes where it left off, and it searches for the next peak or until all coefficients are exhausted. If, on the other hand, a candidate is proven to be an emitter, the candidate's pulses are removed from the times-of-arrival data block, autocorrelation is re-computed and peak detection is restarted.

Re-computation of autocorrelation tends to reduce candidates. This reduces total computational load because autocorrelation is less computationally expensive than candidate integration. Removal and re-computation of autocorrelation often reveals peaks in autocorrelation coefficients previously obscured by another emitter, and it tends to remove peaks caused by interference between emitters and their harmonic combinations. If multiple emitters of the same PRI are present, the same peak in the autocorrelation function will remain until all emitters of that PRI are removed.

During the integration processing (step 64), times-of-arrival are treated as samples of a time-domain signal. A window of samples is stored and processed as a block. The autocorrelation function is a reliable measure of periodic components in the window and also reveals periodic components which are not desired, including harmonics and inter-modulation products. Autocorrelation is a screening device for the processing which follows by providing candidate pulse-repetition periods for further thinning of the available pulses.

Each candidate PRI from autocorrelation causes a time-domain integrator to be established. An integrator consists of a single-dimensioned table that represents one pulse repetition interval of the candidate. The time resolution of each bin of the integrator is the candidate's PRI divided by the number of cells in the integrator. For each pulse in the window, the time of arrival is divided by the resolution of the integrator. The remainder is the cell into which the pulse falls. This cell is then incremented (step 66).

For each candidate declared by autocorrelation, an integrator is established. An integrator is a circular file of integers. It represents a circular period of time equal to the PRI of the candidate. Each bin in the integrator is a time sample in that period. The number of bins in the integrator determines the time-resolution of the integrator and the resolution to which an emitter's PRI can be expressed. For example, integrators of 200 bins can determine PRI to a resolution of 0.5%. Although all integrators have the same number of bins (a system parameter), the absolute resolution varies with PRI. The resolution of an integrator is computed when it is established according to the candidate's PRI/number of bins in integrator.

For candidates whose PRI is less than the nominal integrator size, the integrator is limited to the PRI of the candidate. The resolution, in this case, is limited by the resolution of time of arrival. Typically, each integrator consists of 256 bins for a PRI resolution of 0.39%.

For each pulse in the input data block, time of arrival is divided by the integrator's PRI. The quotient is the number of the candidate's full pulse repetition intervals elapsed from the beginning of the observation window. This is of no value and is discarded. The remainder is the fraction of a candidate's PRI elapsed after the initial full intervals. It is also the time of arrival within the circular time period represented by the integrator (TOA MOD PRI). The result is divided again by the resolution of the integrator to convert arrival time to a bin number in the integrator.

bin=(TOA MOD PRI)/resolution, (rounded)

The content of this bin is incremented indicating where the pulse arrived with respect to the beginning of the integrator. This procedure is repeated for all pulses in the data block. The result is a histogram of all arrival times synchronized to the candidate's pulse repetition interval.

Figure 8:
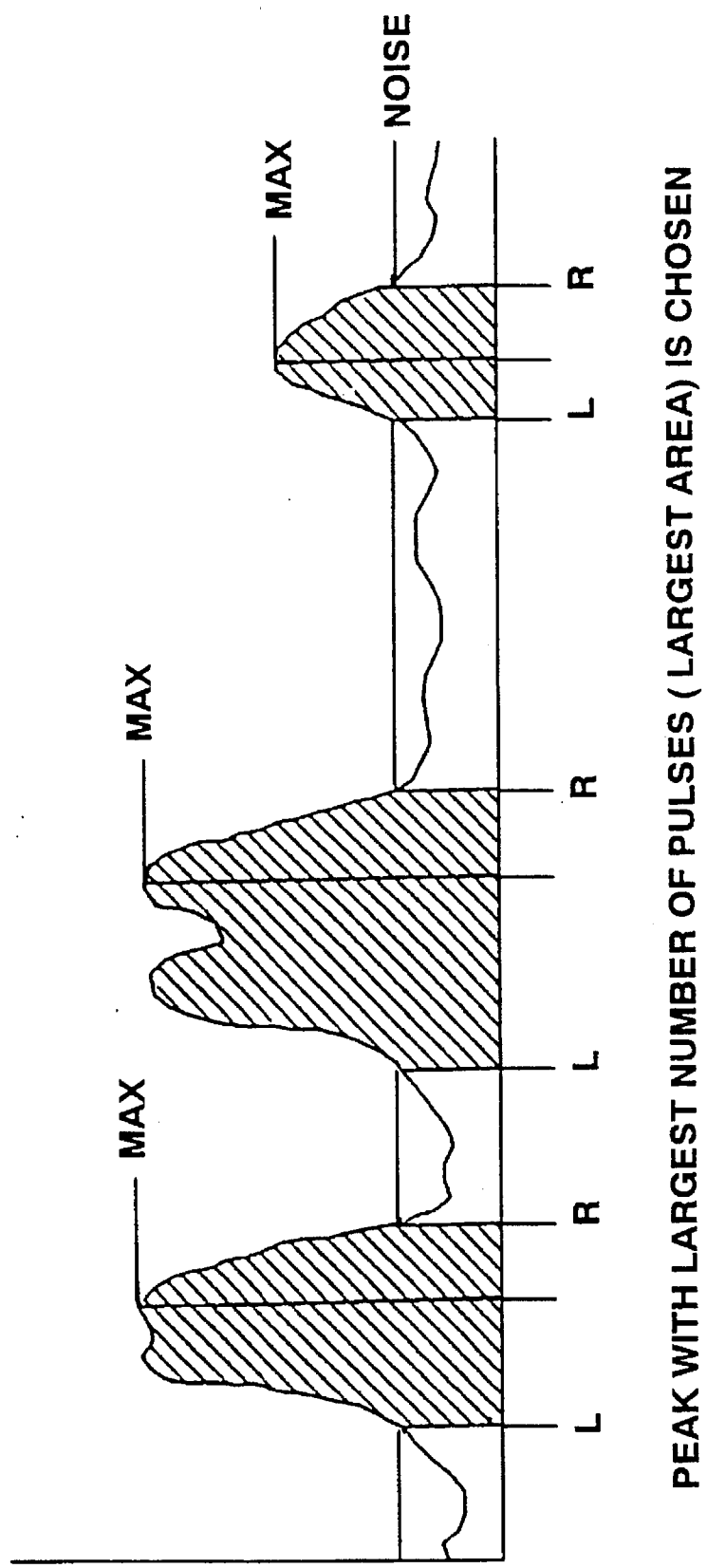
FIG. 8 is a diagram that shows a series of peaks for integrator peak detection.
Figure 9:
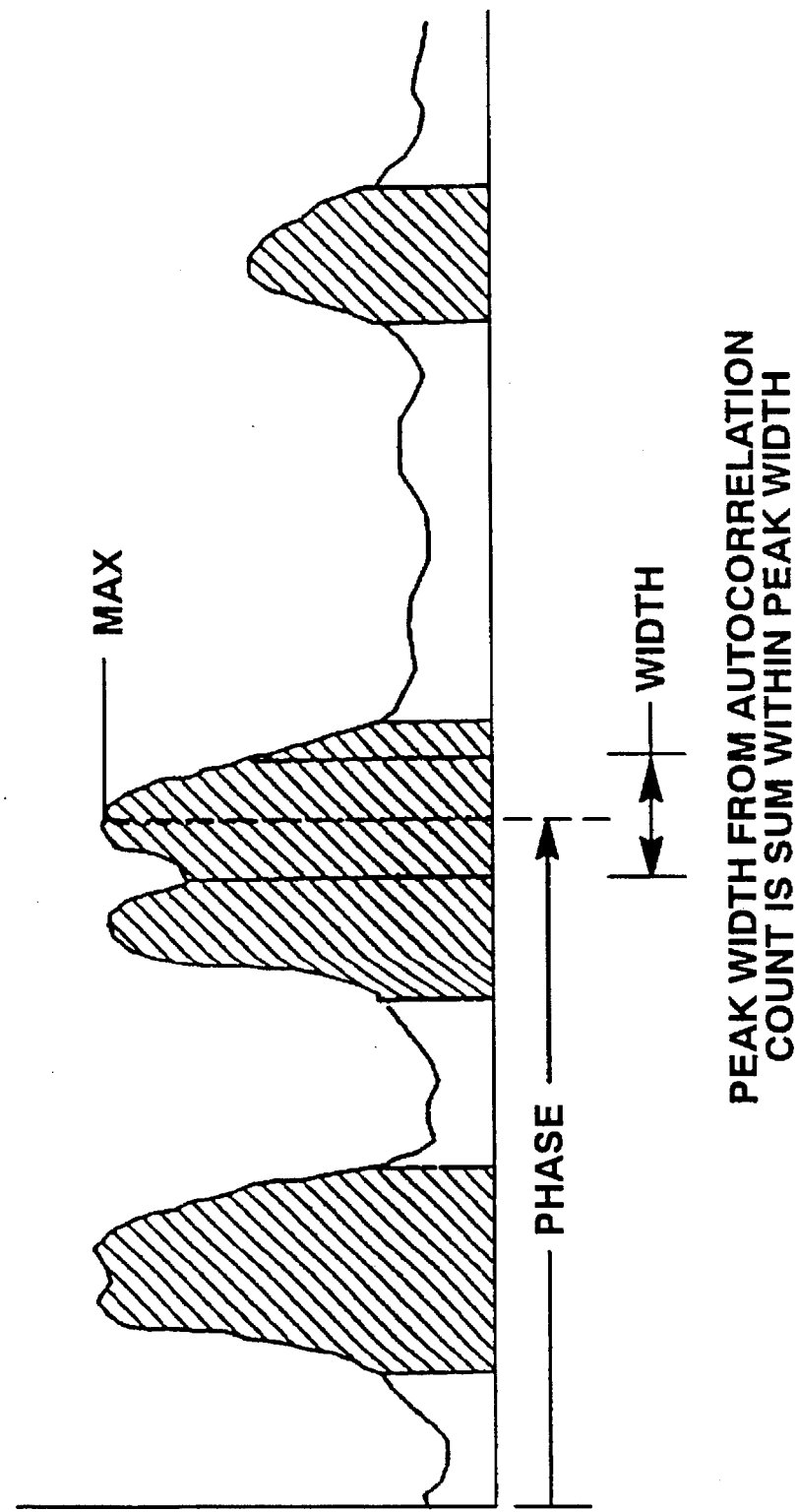
FIG. 9 is a diagram that shows peak width detection from autocorrelation from a series of pulses which can be used to compute the phase and the number of such pulse.

The shape of a peak in an integrator may be complex and poorly defined. Jittered emitters will form wide and jagged peaks unless a large number of pulses is present. Two emitters of close PRI may form a bimodal peak. Measurement errors may broaden peaks. And a noise background composed of pulses of other emitters is irrelevant. Detection of an emitter requires a sophisticated peak detector. This can be done by first finding the autocorrelation or integration (FIG. 8) and then determining whether this peak meets with the criterion of detection (FIG. 9).

First, a noise floor is estimated by noise=pulses in window/bins in integrator.

"Noise" is the expected mean value of an integrator bin if no emitters related to the candidate PRI are present. In this case, arrival times would most likely be scattered evenly throughout the integrator.

An emitter whose PRI matches the integrator will tend to select the same cell for each pulse, causing a peak to appear 120. Other emitters will tend to select a different cell for each pulse 121. An emitter in which a PRI that is an integer sub-multiple of the integrator's PRI will select a set of equally spaced cells. An emitter with a PRI which is a multiple of the integrator's PRI will also select the same cell, but less frequently.

Figure 10C:
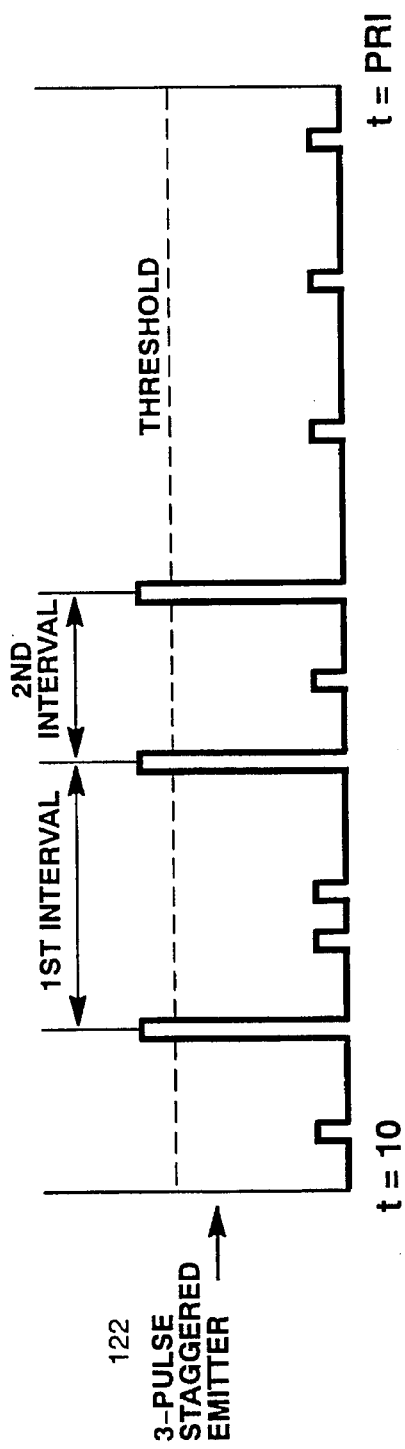
Figure 10D:
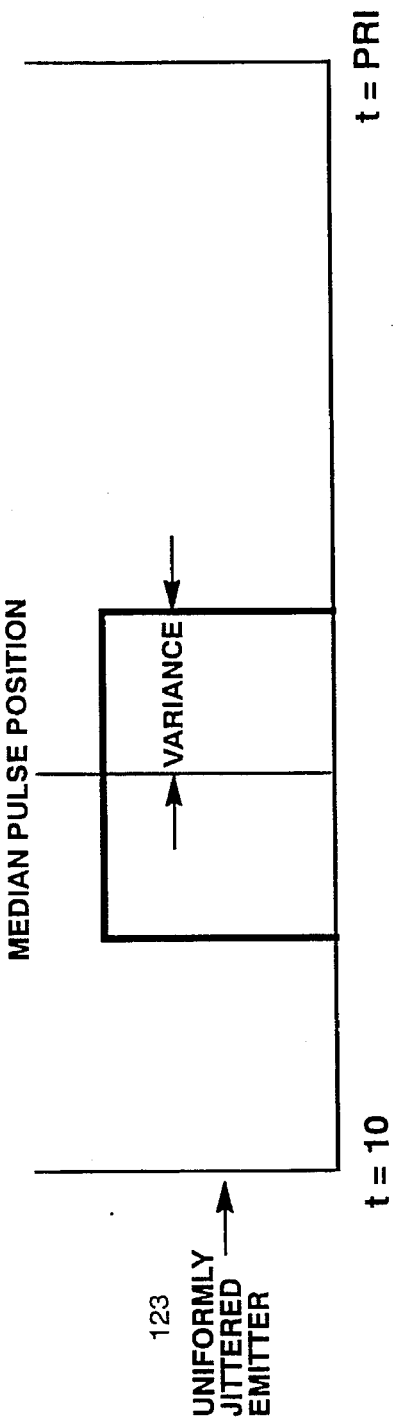
Figure 10E:
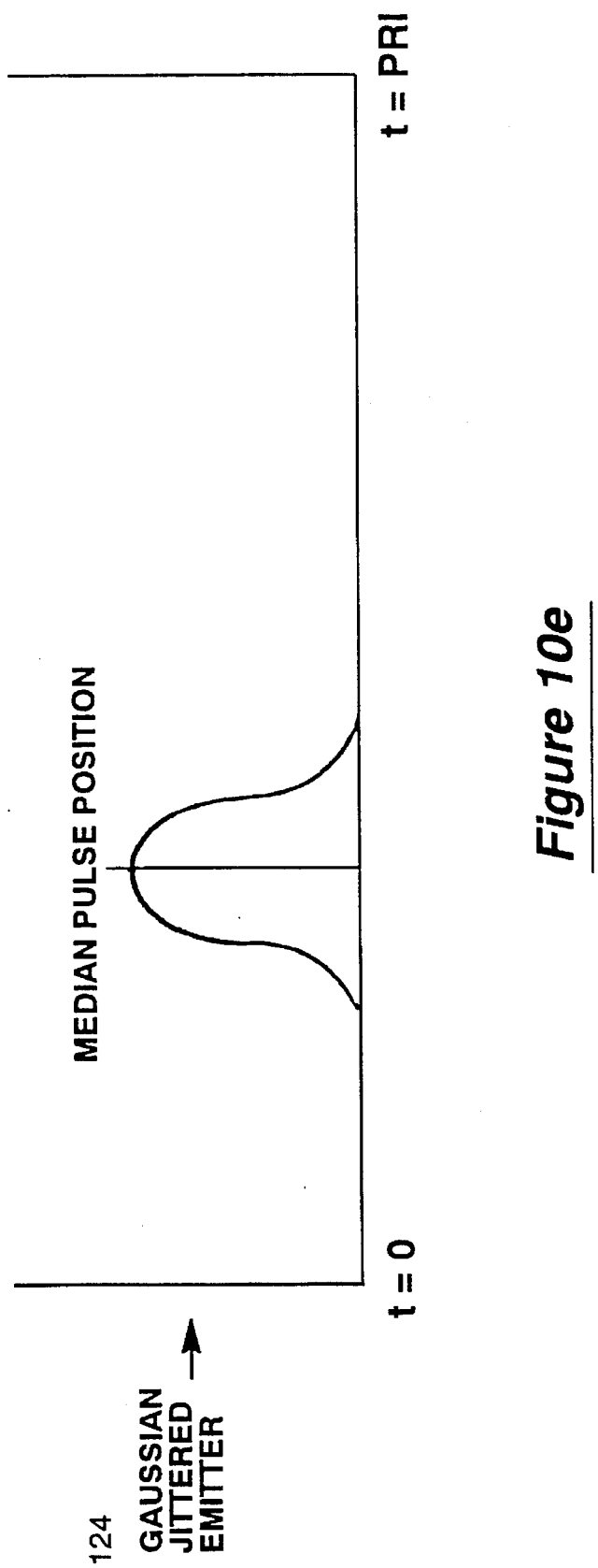

An emitter having the same PRI as the integrator will form an image of the emitter's pulse repetition period 120. Examples of pulses from simple, staggered and clustered emitters are shown in FIG. 10. The location of a peak in the integrator is the relative time offset (phase) between the emitter and the observation window, but it is also the time difference between other emitters of the same PRI. That is, the integrator of a jittered emitter will form an envelope showing the probability density function of its arrival times 123, 124. Staggered emitters will produce a separate peak for each pulse in the period, the distance between them equal to the stagger intervals 122. Stable, single emitters will create only a single peak. Emitters with PRI's not correlated to the period of the integrator will tend to scatter their pulses throughout the integrator, raising only the background noise floor of the integrator. FIGS. 10*a*–10*e* shows pulse streams associated with integrators of various types of emitters.

Detection of an emitter requires peak detection in the integrators, proceeding in order of candidates of smallest PRI's first (step 68). If a peak passes a threshold detection criteria (step 70), an emitter is tentatively declared. But the detection criteria is only an estimate of the number of pulses which can be attributed to this candidate. This estimate may be accurate when the emitter density is low, but when many emitters are present, an integration peak may include pulses from other emitters. Confirmation provides an exact count of pulses present as well as the number of discontinuities, or gaps of missing pulses, in the candidate's pulse train. If these parameters also pass detection criteria (step 72), an emitter is declared and the emitter's pulses are removed from the block of times of arrival (step 74). Autocorrelation is re-started (step 76), and the process is repeated to look for another emitter.

Other properties of an emitter can be extracted, including the phase relationship with the window which is a useful property of staggered emitters. The distribution of pulses in the integrator is an estimate of jitter. The number of pulses present and the number of gaps created by missing pulses are measures of the confidence of the detection. Pulses which cannot be assigned to any emitter are passed on to the next higher band of detection (step 77) until the last integrator is reached (step 78). The PRI, phase and jitter are saved for the processing of the next adjacent time window. The same algorithm used to confirm the presence of a candidate is used to remove known emitters from the next window of time, if still present. This speeds the algorithm and tends to improve accuracy.

Some pulses may remain unassigned even after the highest PRI band is processed. These are analyzed for pulse clusters, a property of rapid-scan emitters which may not have enough pulses to be detected by autocorrelation and integration. If a sufficient number of consecutive, equally spaced pulses are found, a pulse cluster is declared, and the time between pulse clusters of the same PRI may be used as a measure of the emitter's scan rate (step 79).

The de-interleave algorithm does not distinguish jittered emitters from other types of emitters. All emitters are considered to be jittered, differing only in amount of jitter. All emitters are considered to be potentially staggered too. The algorithm does not identify staggered emitters, but phase information produced can be examined by a higher level program over more than one window. If the phase relationship between emitters of equal PRI's is invariant with time, the program may decide a staggered emitter is present.

To detect emitters over a very large range of PRI's, pulses are processed in progressively larger windows, as shown in FIG. 5. Emitters of small PRI require small windows and emitters of large PRI require larger windows. Small windows are processed first, limiting the PRI's searched for to a max PRI appropriate for the window size. Unallocated pulses from small windows are accumulated into larger windows, the max PRI is increased and emitters of larger PRI are sought. The process is inherently parallel and pipelined which lends itself to multi-processor implementation.

Starting with the first bin, a transition from below noise to above noise is sought. The number of consecutive bins above noise are counted and simultaneously the largest value above threshold is found until a bin is found below the noise level. This sequence of above-noise bins is called an envelope. The search is continued for all envelopes in the integrator saving the indexes of the left bin, right bin and bin of the largest value for the largest envelope encountered where the largest is the envelope whose sum of bin contents is greatest.

The sum of the contents of the bins in the envelope is the number of hits for this candidate. Its sum is the number of pulses in the sampling window which could be attributed to the candidate. Its nucleus is a potential nominal time of arrival. Its skirts are close to the noise level so its width is also noisy. But, since it is the envelope with the largest number of hits, it is the most likely envelope to reveal an emitter.

A final confirmation requires re-computing the hits under the envelope restricting the envelope width to the jitter width found by autocorrelation 125. Starting with the bin of largest amplitude in the envelope, bins to the left and right are compared and the larger chosen. The pointer to the larger is incremented and the process repeated, accumulating a sum of the starting bin and all the larger side-bins until the number of bins summed equals or exceeds the peak width specified by autocorrelation.

If the ratio of hits under the envelope to the maximum hits possible exceeds a threshold:

hits_ratio=hits/hits_possible>threshold where hits=sum of contents of bins under envelope, hits_possible=window/candidate's PRI =max possible pulses for candidate's PRI in an observation time of length "window", and the number of bins in the width of the envelope does not exceed a system limit (typically 20% of candidate's PRI, and max jitter expected), then the candidate is tentatively proclaimed to be present in the signal, subject to confirmation.

Note that hits_ratio can exceed 100%. That is, because "hits" can include more than one pulse per PRI. This can happen when two or more emitter's pulses arrive so closely in time that the difference is less than the width of the autocorrelation peak. The integration includes them all. A more accurate count of pulses is performed after detection, during confirmation.

The test for envelope width (jitter) exceeding a system limit could be done much earlier, during autocorrelation. But rejection of a candidate because it has too much jitter seems to rarely occur, so it may be done much later in a portion of the program which occurs less frequently.

Proclamation of a tentative emitter causes the following information to be output:

emitter's PRI, hits ratio as defined above, jitter expressed as percentage from the beginning of the integrator.

The next step is to confirm the candidate's presence by accurately counting the pulses that can be attributed to the candidate and measuring the candidate's discontinuity.

The number of pulses determined to be in the candidate's pulse train by integration is only an estimate. In a high pulse-density environment, a peak in the integrator may be contaminated with pulses from other emitters. A more accurate count of the pulses attributable to the candidate can be made knowing the parameters produced so far. They are:

emitter's PRI, emitter's phase, emitter's jitter.

Emitter confirmation requires one pass through the input data block. Starting with a time offset equal to the emitter's phase, a time-of-arrival is sought that is equal to the time offset and varies no more than the emitter's jitter. If one is found, it is counted. The time offset is increased by the emitter's PRI and another time-of-arrival is sought equal to the updated time offset and, again, varying no more than the emitter's jitter. If found, it too is counted. This process is repeated to the end of the data block. Along the way gaps are counted. A gap is a segment of consecutive missing pulses. The ratio of gaps to pulses-found is called "discontinuity."

Discontinuity is a measure of confidence. One would expect a scanning emitter to have a discontinuity, but not a large number of them in one window. One would also expect interference to destroy consecutive pulses during the period of interference. An occasional pulse may be lost to simultaneous arrival with another emitter's pulse. In these cases, discontinuity would be small, even if the number of missing pulses is large. But if an octave error were made, every other pulse would be missing so discontinuity would equal or exceed 50%. An error caused by combining pulses from different emitters would also tend to produce many gaps raising discontinuity.

If the percentage of pulses present exceeds the threshold and the discontinuity is less than the discontinuity threshold, the presence of the emitter is confirmed. It can now be removed from the input data block.

Emitters of high pulse-density can obscure emitters of low pulse-density, and emitters of the same or close PRI may not be resolved at first, so it is important to remove an emitter's pulses from the input data block before attempting to find another emitter. The same three parameters from the detection process that were used by confirmation make this possible. They are:

emitter's PRI, emitter's phase, emitter's jitter.

Emitter removal requires one more pass through the input data block. (It might be possible to combine it with confirmation. ) Starting with a time offset equal to the emitter's phase, a time-of-arrival is sought that is equal to the time offset and varies no more than the emitter's jitter. The first one found is removed from the data block.

If two or more times-of-arrival meet this criteria, it is not possible to know which of these pulses belongs to the emitter being removed. Choosing the first is arbitrary. This is a potential source of error. If the wrong pulse is chosen, the accuracy of the estimate of jitter of another emitter might be affected. If more information were available, such as the pulses', amplitudes or widths, it might be possible to make a better selection.

The time offset is increased by the emitter's PRI and another time-of-arrival is sought equal to the updated time offset and, again, varying no more than the emitter's jitter. If found, it too is removed. This process is repeated to the end of the data block removing the same pulses found by confirmation.

When the removal of an emitter is complete, the entire process is restarted beginning with a new autocorrelation. Because low-PRI emitters tend to be removed first, those emitters with the largest number of pulses tend to be the ones that are removed first, which reduces subsequent computational load exponentially.

The emitter environment may contain a very large range of PRI's, perhaps as large as four orders of magnitude. In order to detect an emitter with as few pulses as possible, the window length 126 must be matched to the minimum time duration of the emitter's presence. One window for all emitters could contain too many pulses to process efficiently, and emitters with a very small percentage of pulses would have signal-to-noise ratios too small for reliable detection. Small windows are needed to detect small-PRI emitters and larger windows are needed for large-PRI emitters. The solution employed in the invention is to provide progressively larger windows and bands of PRI's.

It is possible to use the candidate-selection process as a bandpass filter by restricting the range of candidates. We define step size as the ratio of MAX PRI to MIN PRI within a band, and we define overlap as the percentage of the lower band in common with the next larger band. Band overlap should be at least as large as the maximum jitter expected so that a jittered emitter will be entirely in one band.

Processing several time-consecutive windows results in unallocated pulses being combined into a larger window with a larger MAX PRI. Several adjacent larger windows also produce unallocated pulses which are combined into still larger windows with still larger MAX PRI. Several adjacent larger windows also produce unallocated pulses which are combined into still larger windows with still larger MAX PRI. This process continues until either all pulses have been assigned or no more emitters can be found in the highest band. The number of unclaimed pulses are output and may be useful as a measure of the success of the processing.

When an emitter is found in the previous time window, autocorrelation and integration can be skipped, passing directly to confirmation and removal to remove the pulses of constantly illuminating emitters before searching for other emitters. As long as the probability that an emitter present in one window is present in the next is high, there will be a net savings in computational work.

When an emitter is detected, its PRI, phase and jitter width is stored in a list of sequential hits. When the next window of the same band is processed, these data are used to confirm the presence of the emitter, and, if present, remove it prior to autocorrelation and integration. Because confirmation and removal are less computationally intensive, a net savings in work-load occurs.

The method also tends to improve detection. In one trial an emitter was correctly detected, but the phase was slightly incorrect. Removal continued in several sequential windows until the error in phase caused a failure to confirm. The autocorrelation and integration then re-detected the emitter, but this time accurately computed phase. Subsequent known-emitter removal proceeded without failure to confirm. This illustrates two features of known emitter removal: (a) erroneous detections are immediately dropped without propagating, and (b) emitter parameter estimates tend to improve with time.

Rapid-scan emitters are seen as clusters of low-PRI pulses separated by a scan period. A cluster may not have enough pulses to exceed the threshold used in integration and confirmation, nor is it likely to have an autocorrelation peak large enough to rise above the background noise or be resolved from emitters with more pulses. Lowering these thresholds would cause a prohibitive increase in computation work due to a rise in false candidates, and it would raise the false-alarm rate as well. False alarms tend to limit the detection of other emitters.

The solution is to let the clusters go undetected while all other emitters are found and removed. Then, after the highest PRI band (and widest subwindow) is processed, the clusters will remain as unassigned pulses unobscured by other emitters. At this point the algorithm looks for small pulse groups consisting of consecutive pulses, equally-spaced within the limit of quantization noise.

One pass is made through the unallocated pulses comparing each pulse interval to the preceding pulse interval. If at least a defined minimum number of consecutive, equally spaced intervals are found, a clustered emitter is proclaimed and the search continues for more clusters. A trial detected 7 of 8 pulses of an emitter mixed with over 2000 pulses from other emitters of both higher and lower PRF's. The algorithm is very fast and creates no extra candidates.

There are no dynamically changing thresholds. There are only two fixed thresholds. "Threshold" is the percentage of pulses present compared to the max possible for the window. It is used for both candidate selection in autocorrelation and envelope evaluation in integration.

If "threshold" is set too high, emitters with missing pulses will be missed and PRI's of integer multiples of actual emitters will be declared instead (if they meet the required number of pulses). Setting the threshold too low may cause false alarms built from combinations of emitters. In no case should the threshold be set below 50% for this will cause sub-multiple PRI errors. A threshold of about 60% is typical.

The other threshold is "discontinuity." It is the number of gaps in a candidate's pulse train caused by missing pulses, expressed as a percentage of total pulses possible.

Other parameters are:

max jitter width expected as a percentage of PRI,

PRI resolution needed, determines integrator size,

MAX PRI to be sought,

MIN PRI that can exist, band step size, band overlap

If two stable emitters of the same PRI happen to be exactly (within the resolution of time-of-arrival) 50% out of phase, it is impossible to distinguish them from a single emitter of half the PRI. But as soon as their phase differs by the resolution of the autocorrelation function (approximately two time-of-arrival bins) two peaks will form in the autocorrelation function, and they will be identified. Therefore, we should expect occasional octave errors like this to occur when multiple emitters of the same PRI or integer-multiple PRI's are present. This phenomenon will occur more frequently for jittered emitters and staggered emitters.

More pulses, and therefore more time, are required to identify jittered emitters. They form low, wide and noisy peaks in both autocorrelation and integration. Accurate estimation of peak height and width requires more data to define a peak than a stable emitter and is more likely to cause errors when insufficient data are present. Care in choosing window lengths is important.

Distinguishing a staggered emitter from multiple non-staggered emitters of the same PRI requires accurate estimation of phase and observation of phase over time. This requires additional pulses and a longer time interval.

Estimates of Gaussian jitter width tend to be less than actual jitter width. That is because pulses at the extremes of a Gaussian distribution are less frequent and more likely to be missing. The jitter measured is the range of intervals actually present in the window, not the range statistically possible. It is dependent on the skirts of the autocorrelation function which are low in amplitude and inherently noisy.

Figure 11:
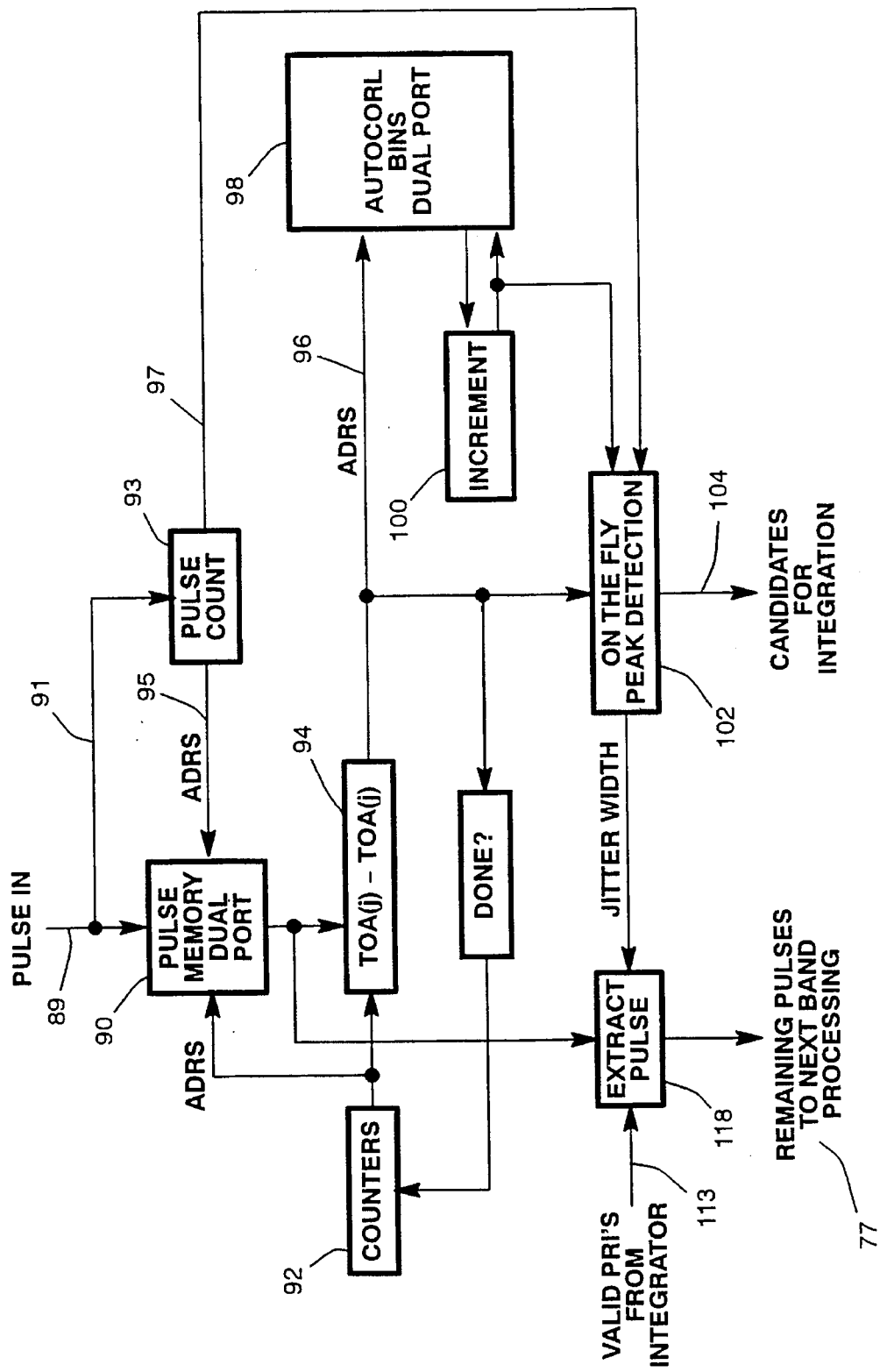
FIG. 11 is a block diagram of the hardware circuit to perform an autocorrelation computation.

A block diagram of an implementation of the autocorrelation process within a given PRF band is shown in FIG. 11. Incoming pulses (input 89) are stored in the pulse memory (step 90). Control counters (92) run through the autocorrelation process to measure the TOA and to supply a signal representative of this as an address (line 96) to the autocorrelation bins 98. The TOA of each set of two pulses are subtracted forming a memory address for the autocorrelation bins (step 94). The bin question is then incremented (step 100), and the incrementation is noted for peak detection outputs (103, 107). The peak detection (step 102) examines the result of each increment and keeps track, on the fly, of which bins go above threshold so that a final pass through the bins is not necessary. The result of the peak detection is the selection of candidates for integration (output 104) and an estimate of jitter width (output 105).

Times of arrival may be evaluated as a "1" in a sampled time series of equally spaced time bins. Bins not having a pulse are valued as a "0". The autocorrelation function then involves multiplying 1's and 0's and adding 1's and 0's. This reduces the multiply and add to a logical OR and increment. The computation can be reduced still further by skipping offsets which produce zero's. This is accomplished by incrementing the autocorrelation array location TOA(i)–TOA(j), where i is an index through all pulses and j is an offset from i to the end of the block. TOA(i)–TOA(j) is the lag.

The computation can be reduced still further by not using all lags. Lags are equivalent to PRI's and we are generally interested in detecting PRI's only within a limited range. The computation can be skipped for lags less than the minimum PRI of interest and the inner loop can be terminated as soon as a lag exceeds the maximum PRI of interest. The C-language equivalent of the computation becomes:

```
for (i=0; i<I-1; i++) {          /* for each pulse of I pulses         */
    for (j=i+1; j<I; j++) {       /* for following pulses               */
        lag = toa[j] - toa[i];    /* lag is time between pulses         */
        if(lag<minpri) continue;  /* skip lags less than min PRI        */
        if(lag>maxpri) break;     /* quit when lag greater than max PRI */
        ++autocor[lag];           /* increment autocor cell at lag      */
    }
}
```

The number of iterations of the inner loop is a function of the nature of the emitters present, not the window size. For any given emitter environment, the computational burden is proportional to i alone.

Figure 12:
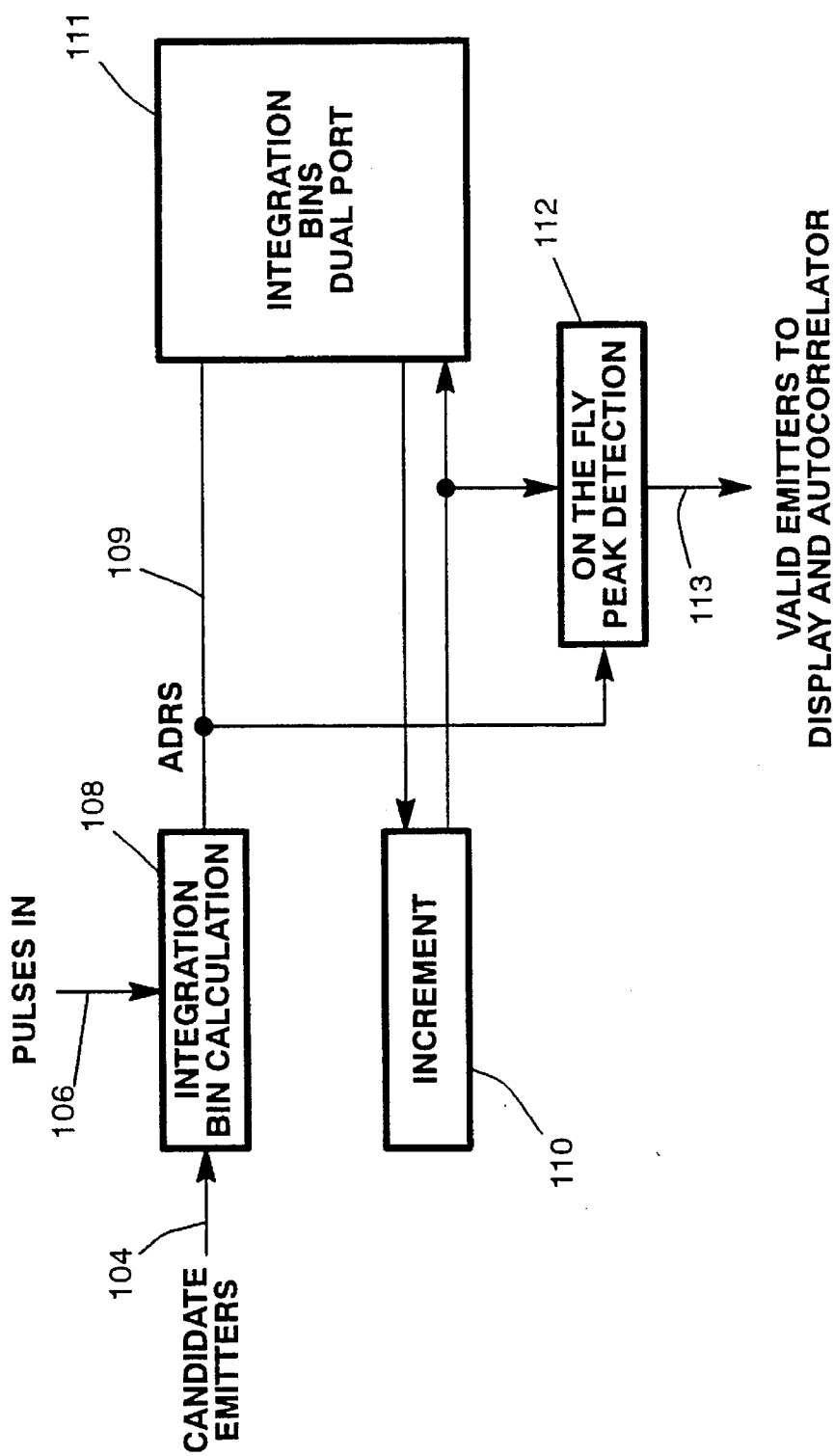
FIG. 12 is a block diagram of the hardware circuit to perform one integration and peak detection.

Candidate emitter PRI's are passed to the integrator scheduling logic (output 104) schedules an integrator from a common pool of integrators. Scheduling from a common pool saves a significant amount of logic versus building enough integrators for each stage of autocorrelation. A block diagram of an integrator is shown in FIG. 12. For each incoming pulse (line 106), a bin address is calculated at the integration bin calculation (step 108) based on the candidate PRI which is supplied on the line 109 to the integration bins dual port (step 111). That bin is then incremented (step 110), and on the fly peak detection (step 112) is performed to find the valid emitters after the incrementation is noted (output 115). The valid PRI's are used to extract the pulses (output 123) of the detected emitters from the pulse stream (step 117) which relies on input 119 from the dual port memory on jitter width input 105 and an indication of valid PRI's from the integrators on input 121. The remaining pulses are then passed on to the next band for further processing. The TOA calculation is supplied for peak detection (output 125) for determining when a set of calculations is done (step 127) via (output 127) which signals the control counters 92.

What is claimed is:

1. A method of detecting and classifying received pulses from a plurality of emitters comprising, deinterleaving said received pulses into bands of pulse repetition intervals (PRI's) so that a fixed number of pulses are required for detection of an emitter regardless of the PRI of the emitter, determining pulse periodicities of said received pulses by autocorrelation, selecting candidate emitter PRI's from said pulse periodicities, time-integrating the pulses of candidate emitters PRI's to obtain time-integrated signals, detecting possible emitters from peaks in said time-integrated signals, and confirming emitter existence by measuring time-continuity of said pulses.

2. A method as claimed in claim 1 wherein pulses from both jittered and non-jittered emitters are received further comprising:

detecting the peak pulse widths of said peaks, estimating jitter width in a pulse stream by utilizing said peak pulse widths, and removing jittered emitters from a pulse stream by predicting the times-of-arrival of a pulse stream base upon estimated jitter of previous pulse stream.

3. A method as claimed in claim 1 wherein pulses from both staggered and non-staggered emitters are received further comprising:

identifying the pulse-repetition intervals and phase relationship characteristics of staggered emitters by computing the time received pulses are offset from each emitter with respect to a time window.

4. A method as claimed in claim 1 wherein pulses from both clustered and non-clustered emitters are received further comprising:

identifying clustered emitters by eliminating the times of arrival of received pulses of emitters having periodic pulse characteristics, and measuring the time differences of the remaining pulses.

5. A method of processing radar pulse data of received pulses from a plurality of emitters comprising:

detecting and measuring bearing and frequency data from said received pulses, and performing autocorrelation of said pulses in separate frequency bands, confirming the existence of detected emitters of said received pulses by measuring the time-continuity of said received pulses, removing the data of said received pulses that are associated with said confirmed emitters, and analyzing said removed data to obtain emission characteristics of said confirmed emitters.

6. A method as claimed in claim 5 wherein pulses from both jittered and non-jittered emitters are received further comprising:

detecting the peak pulse widths of said peaks, estimating jitter width in a pulse stream by utilizing said peak pulse widths, and removing jittered emitters from a pulse stream by predicting the times-of-arrival of a pulse stream base upon estimated jitter of previous pulse stream.

7. A method as claimed in claim 5 wherein pulses from both staggered and non-staggered emitters are received further comprising:

identifying the pulse-repetition intervals and phase relationship characteristics of staggered emitters by computing the time received pulses offset from each emitter with respect to a time window.

8. A method as claimed in claim 5 wherein pulses from both clustered and non-clustered emitters are received further comprising:

identifying clustered emitters by eliminating the times of arrival of received pulses of emitters having periodic pulse characteristics, and measuring the time differences of the remaining pulses.

* * * * *